(12) United States Patent
Nagashima et al.

(10) Patent No.: US 9,002,074 B2
(45) Date of Patent: Apr. 7, 2015

(54) FACIAL VALIDATION SENSOR

(71) Applicant: Azbil Corporation, Tokyo (JP)

(72) Inventors: Sei Nagashima, Tokyo (JP); Hiroshi Nakajima, Tokyo (JP)

(73) Assignee: Azbil Corporation, Tokyo (JP)

( * ) Notice: Subject to any disclaimer, the term of this patent is extended or adjusted under 35 U.S.C. 154(b) by 128 days.

(21) Appl. No.: 13/780,208

(22) Filed: Feb. 28, 2013

(65) Prior Publication Data

US 2013/0223699 A1 Aug. 29, 2013

(30) Foreign Application Priority Data

Feb. 29, 2012 (JP) ................. 2012-042869

(51) Int. Cl.
*G06K 9/00* (2006.01)
*G05B 19/00* (2006.01)
*G06F 21/00* (2013.01)

(52) U.S. Cl.
CPC ........ *G06K 9/00221* (2013.01); *G06K 9/00919* (2013.01)

(58) Field of Classification Search
CPC .......... G06K 9/00221; G06K 9/00919; G06K 9/00228; G06K 9/00288; G06K 9/00281; G06K 9/00248; G06K 9/00
USPC .......... 382/100, 115, 118, 117, 181, 209, 124, 382/116, 224, 225, 165, 162; 713/186, 182; 340/5.82, 5.53, 5.52, 5.83; 726/7, 5
See application file for complete search history.

(56) References Cited

U.S. PATENT DOCUMENTS

| | | | | |
|---|---|---|---|---|
| 7,142,697 | B2 * | 11/2006 | Huang et al. ................. | 382/118 |
| 8,788,977 | B2 * | 7/2014 | Bezos .......................... | 715/863 |
| 2007/0189583 | A1 * | 8/2007 | Shimada et al. ............. | 382/118 |
| 2007/0253604 | A1 * | 11/2007 | Inoue et al. .................. | 382/118 |
| 2010/0246904 | A1 * | 9/2010 | Yamashita et al. ........... | 382/118 |

FOREIGN PATENT DOCUMENTS

| | | |
|---|---|---|
| JP | 2007-4613 A | 1/2007 |
| KR | 20-1999-0019420 U | 6/1999 |

OTHER PUBLICATIONS

Korean Office Action, dated Dec. 20, 2013, which issued during the prosecution of Korean Patent Application No. 10-2012-0147540.

* cited by examiner

*Primary Examiner* — Sheela Chawan
(74) *Attorney, Agent, or Firm* — Troutman Sanders LLP

(57) ABSTRACT

A facial validation sensor includes an imaging element, a validating unit and a feedback unit. The validating unit performs validation of an individual to be validated based on facial image data of the individual, imaged by the imaging element, and facial image data registered in advance. The feedback unit guides a face of the individual to be within an imaging range that is imaged by the imaging element. The feedback unit is an indicator providing unit that provides an indicator that is viewable from a specific direction within the imaging range that is imaged by the imaging element.

4 Claims, 12 Drawing Sheets

FACIAL VALIDATION SENSOR

CROSS REFERENCE TO RELATED APPLICATION

This application claims priority to Japanese Patent Application No. 2012-042869, filed on Feb. 29, 2012, the entire content of which being hereby incorporated herein by reference.

FIELD OF TECHNOLOGY

The present invention relates to a facial validation sensor for validating an individual to be validated by matching an inputted facial image, wherein the face of an individual to be validated has been imaged, with a registered facial image that has been registered in advance, and, in particular, relates to a facial validation sensor having a feedback unit that guides the face of the person to be validated into a location that is suitable for validation.

BACKGROUND ART

As sensors for validating individuals there are facial validation sensors for validating a user through the use of an image of a face or the use of a feature quantity extracted from an image of a face (hereinafter termed, in general, "facial image data").

This type of facial validation sensor validates a user by matching facial image data, obtained through the use of a camera to image the face of the individual to be validated (input facial image data), with facial image data that has been registered in advance (registered facial image data).

Consequently, in order to perform accurate validation using facial image data, preferably, when obtaining the input facial image data, the orientation of the face in the input facial image data in the imaging region of the facial validation sensor is always the same orientation (for example, "face forward") as in the registered facial image data. Given this, the facial validation sensor must have a feedback unit that guides the face of the person to be validated into the imaging region that is imaged by the camera.

In conventional facial validation sensors there has been a proposal, such as in Japanese Unexamined Patent Application Publication 2007-4613 ("the JP '613"), for the placement of a convex mirror in the vicinity of a wide-angle camera to enable each individual to be validated to visually check his or her own face in a portion of the mirror, so that the face will reliably be facing the convex mirror and the wide-angle camera when the face is imaged, in order to capture facial images that are facing the same direction even when there is variability in the stature of the individuals to be validated, as the feedback unit that guides the face of the individual to be validated into the imaging region that is imaged by the camera.

However, even though the technology disclosed in the JP '613 is able to cause the individual to be validated to direct his or her face in a specific direction, the region that is reflected in the convex mirror changes depending on the distance from the convex mirror, thus making it difficult to ensure a distance from the camera wherein the face of the individual to be validated will be within the imaging region of the facial validation sensor, and thus there was the danger that the face of interest would extend outside of the imaging region of the facial validation sensor, producing variability in the validation results.

Given this, the object of the present invention is to provide a facial validation sensor that is both able to cause the face of the individual to be validated to face in a specific direction, and able to induce the face of the individual to be validated into the imaging region of the facial validation sensor regardless of the distance between the individual to be validated and the camera.

SUMMARY

In order to achieve the object set forth above, the present invention includes an imaging element, a validating unit that performs validation of an individual to be validated, based on facial image data of the individual to be validated, imaged by the imaging element, and on facial image data registered in advance, and a feedback unit that guides the face of the individual to be validated into an imaging range that is imaged by the imaging element. The feedback unit is an indicator providing unit that provides an indicator that can be viewed from only a specific direction in the region that is imaged by the imaging element.

Here the feedback unit may be, for example, a flat mirror that reflects the face of the individual to be validated, and may be configured so that the direction of the normal line of the flat mirror is coincident with the specific direction.

Moreover, the feedback unit may be, for example, a feedback unit having a lenticular lens wherein a plurality of cylindrical lenses are arranged equally spaced and a pattern is applied to the lenticular lens that is a visual marker wherein the specific indicator can be seen, as said indicator, from only the specific direction.

Moreover, the feedback unit may be a light-emitting device that has, for example, a linear cylindrical member and a light source that is disposed in the vicinity of one and portion of this cylindrical member, where the axis of the cylindrical member is coincident with the specific direction.

Moreover, the facial validation sensor may further include an optics system that is provided between the imaging element and the individual to be validated and provides a stereo image to the imaging element, where the feedback unit may be provided adjacent to the optics system.

The present invention is able to guide the face of the individual to be validated into an imaging region of the facial validation sensor, and able to cause the face of the individual to be validated to face in a specific direction, regardless of the distance between the individual to be validated and the camera, through having the individual to be validated view the indicator.

The present invention can be used in the field of facial validation sensors.

DETAILED DESCRIPTION

Figure 1:
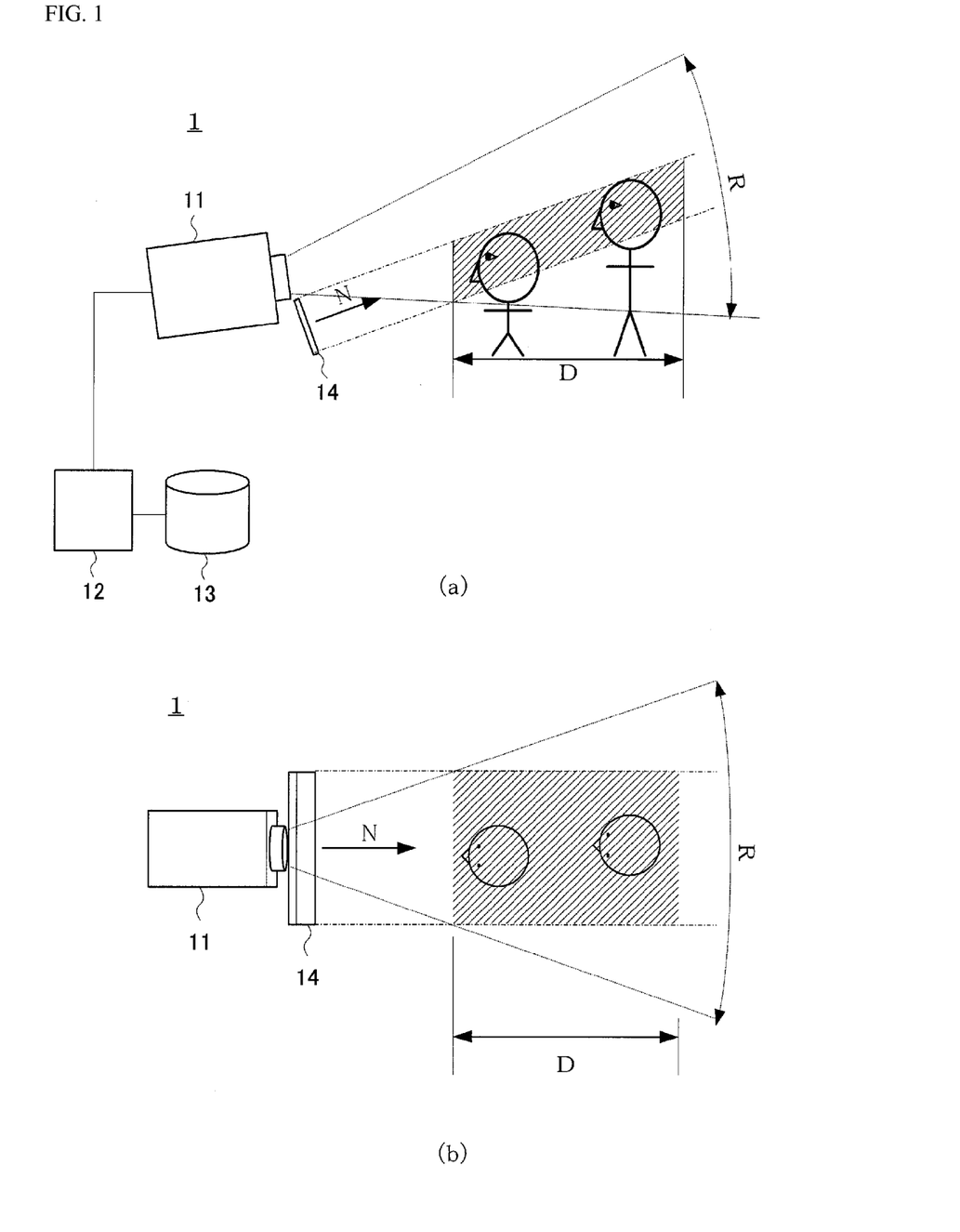
FIG. 1 is a diagram for explaining a facial validation sensor according to Example according to the present invention.

Examples according to the present invention will be explained below, referencing the drawings.
Example FIG. 1 illustrates the structure of a facial validation sensor 1 according to Example according to the present invention. FIG. 1 (*a*) is a side view diagram illustrating a schematic of the facial validation sensor 1 and illustrating a situation where the relationships between the facial validation sensor 1 and the individuals to be validated, having different statures, are viewed from the side, and FIG. 1 (*b*) is a top view diagram illustrating a situation where the relationships between the facial validation sensor 1 and individuals to be validated, having different statures, are viewed from the side.

The facial validation sensor 1 according to the Example includes a camera 11 that has a built-in imaging element, a database 13 that registers facial image data that is obtained in advance (registered facial image data), a validating unit 12 that validates individuals to be validated based on facial image data of the individual to be validated, imaged by the camera 11 (input facial image data) and the registered facial image data that is registered in advance in the database 13, and a flat mirror 14 that operates as a feedback unit that guides the face of the individual to be validated into an imaging region that is imaged by the camera 11.

Preferably the camera 11 uses a wide-angle camera that has a deeper depth of field. Depending on the application for the facial validation sensor 1, the camera 11 that is disposed facing in an appropriate direction has an imaging region R, such as illustrated in FIG. 1, and takes an image of a subject that is positioned within a specific range (the area indicated by the symbol D in FIG. 1, hereinafter termed the "comparison range") that is at least a specific distance (for example, 30 cm) from the camera 11, and outputs the image data to the validating unit 12.

Note that the comparison range D is determined as appropriate based on a balance between the frame of the image data that is captured by the camera 11 and the size of the face of the individual to be validated, along with the resolution of the camera 11, and the physical conditions in the surroundings wherein the facial validation sensor 1 is installed.

The validating unit 12 is structured from a computer that is provided with a central processing unit, memory, and input/output devices such as a keyboard and a display device, and the like, and a program for executing a facial validation algorithm on said computer.

The facial validation algorithm extracts, as input facial image data, as input facial image data, prominent features from the facial image of the individual to be validated, such as the relative locations and sizes of facial parts, and the shapes of the eyes, nose, cheekbones, and jaw, and compares them with the registered facial image data that is registered in advance in the database 13, to search for images with matching features. As prominent facial validation algorithms there are Eigenface using principal component analysis, linear discriminant analysis, elastic bunch graph matching, the hidden Markov model, neuron-driven dynamic link comparison, and the like.

If the result of performing the facial validation algorithm is that there is an image in the registered facial image data, which have been registered in advance, matching the input facial image data, then the individual to be validated is validated, but if no image matching the input facial image data can be found in the registered facial image data, then the individual to be validated is not validated.

In the Example, the flat mirror 14 that is disposed in the vicinity of the camera 11 has limited lengths both vertically and horizontally, and is shaped as a flat rectangle having a height of about 3 cm and a width of about 10 cm, where the normal line N of the flat mirror 14, as illustrated in FIG. 1, is directed in essentially the same direction as the direction of imaging of the camera 11. The individual to be validated is able to view his or her own face in the flat mirror 14, to place his or her own face within the imaging region of the camera 11, facing a location that is appropriate for facial validation.

Figure 2:
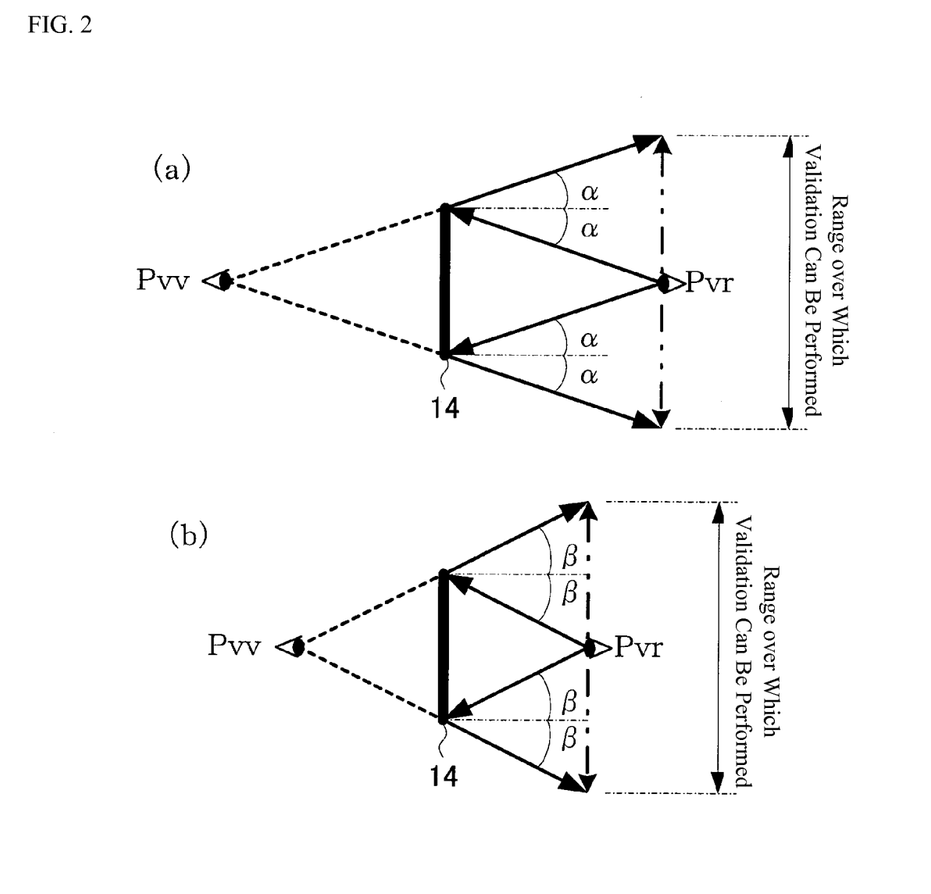
FIG. 2 is a diagram for explaining the operation of the flat mirror in the facial validation sensor according to the Example.

Here the principle of the flat mirror 14 as the feedback unit will be explained in reference to FIG. 2. FIG. 2 is a diagram illustrating the relationship between the distance between the viewpoint Pr of the individual to be validated and the flat mirror 14 and the width of the region that is visible from the individual to be validated, showing the situation wherein the viewpoint Pvr of the individual to be validated is closer to the flat mirror 14 in FIG. 2 (*b*) than it is in FIG. 2 (*a*). Note that Pvv shows the virtual viewpoint at a location that is symmetrical to the viewpoint Pvr of the individual to be validated, with the flat mirror 14 therebetween.

The distance between the viewpoint Pr of the individual to be validated and the flat mirror 14, illustrated in FIG. 2 (*a*) is longer than the distance between the viewpoint Pr of the individual to be validated and the flat mirror 14, illustrated in FIG. 2 (*b*), but the range that includes the face that can be seen by the individual to be validated (termed the "visible range"), in both cases, is twice the size of the flat mirror 14, and thus it is understood that it is independent of the distance between the flat mirror 14 and the individual to be validated.

In this way, typically a flat mirror 14 has the property of the region that is reflected in the flat mirror 14, when viewed by the individual to be validated, being constant, regardless of the distance between the flat mirror 14 and the individual to be validated. Moreover, the face that is reflected in the flat mirror 14 can be seen only from the direction of the normal line (N) of the flat mirror 14.

Consequently, if the person to be validated places his or her face at a location wherein the face can be seen reflected in the flat mirror 14, in the comparison range D (FIG. 1) of the facial validation sensor 1, then regardless of the distance between the individual to be validated and the camera 11, the face of the individual to be validated will be placed within the imaging range of the camera 11, facing a direction that is appropriate for validation.

In other words, the flat mirror 14 in the Example provides the face that is reflected in the mirror 14 (and, in particular, the eyes and the vicinity thereof) as an indicator when the individual to be validated is positioning the location and orientation of his or her own face, in the imaging region (R) that is imaged by the camera 11.

As described above, the Example makes it possible to induce the face of the individual to be validated into the imaging region of the facial validation sensor, and to cause the individual to be validated to turn the face in a specific direction (toward the camera 11), regardless of the distance between the individual to be validated and the camera 11, through having the individual to be validated place his or her own face so as to be able to view the reflection of his or her own face in the flat mirror 14 within the comparison range D of the facial validation sensor 1.

Another Example

Figure 3:
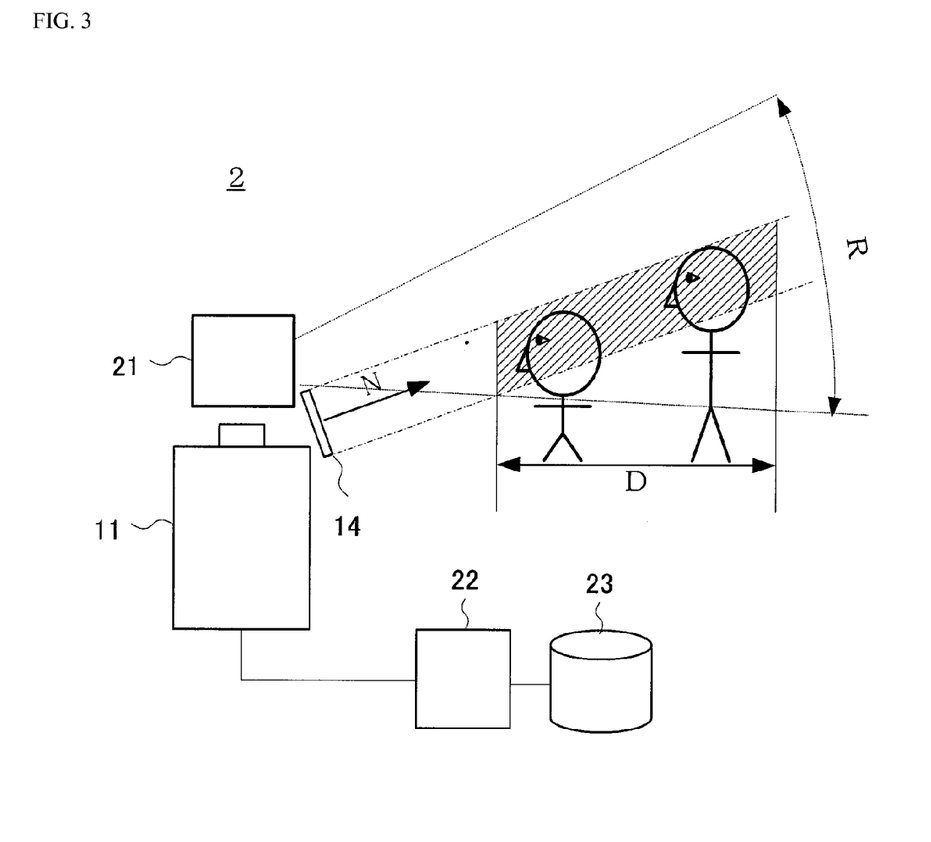
FIG. 3 is a diagram for explaining a facial validation sensor according to Another Example according to the present invention.

Another Example according to the present invention will be explained next. The Another of Example according to the present invention is provided with an optics system, between the camera 11 and the individual to be validated, for producing a stereo image. The configuration thereof is illustrated in FIG. 3.

The facial validation sensor 2 according to the Another Example includes a camera 11 that has a built-in imaging element, an optics system that provides a stereo image to a monocular camera 11 (hereinafter termed a "stereo adapter") 21, a database 23 that registers facial image data that is obtained in advance (registered facial image data), a validating unit 22 that validates individuals to be validated based on a facial image data of the individual to be validated, imaged by the camera 11 (input facial image data), and the registered facial image data that is registered in advance in the database 23, and a flat mirror 14 that operates as the feedback unit that guides the face of the individual to be validated into an imaging region that is imaged by the camera 11.

While the facial validation sensor 2 according to the Another Example differs from the facial validation sensor 1 according to the Example, set forth above, in the point that a stereo adapter 21 is provided, the point that the physical direction of the camera 11 is the direction of the stereo adapter 21, the point that the validating unit 22 and the database 23 are compatible with stereo images, and the point that the flat mirror 14 is provided in the vicinity of the stereo adapter 21, they have the other aspects in common. Consequently, those structural elements that are in common with those of the Example are indicated using identical codes, and detailed explanations thereof are omitted.

Moreover, because, in the Another Example, the structure is such that a stereo image is captured by a monocular camera 11, through the provision of the stereo adapter 21, the validating unit 22 that executes the facial validation algorithm, and the database 23 that stores the registered facial image data, both are compatible with stereo images; however, the point in that validation is performed based on features of facial images is no different from the facial validation sensor set forth in the Example, and thus detailed explanations of the facial validation algorithms themselves are omitted.

Figure 4:
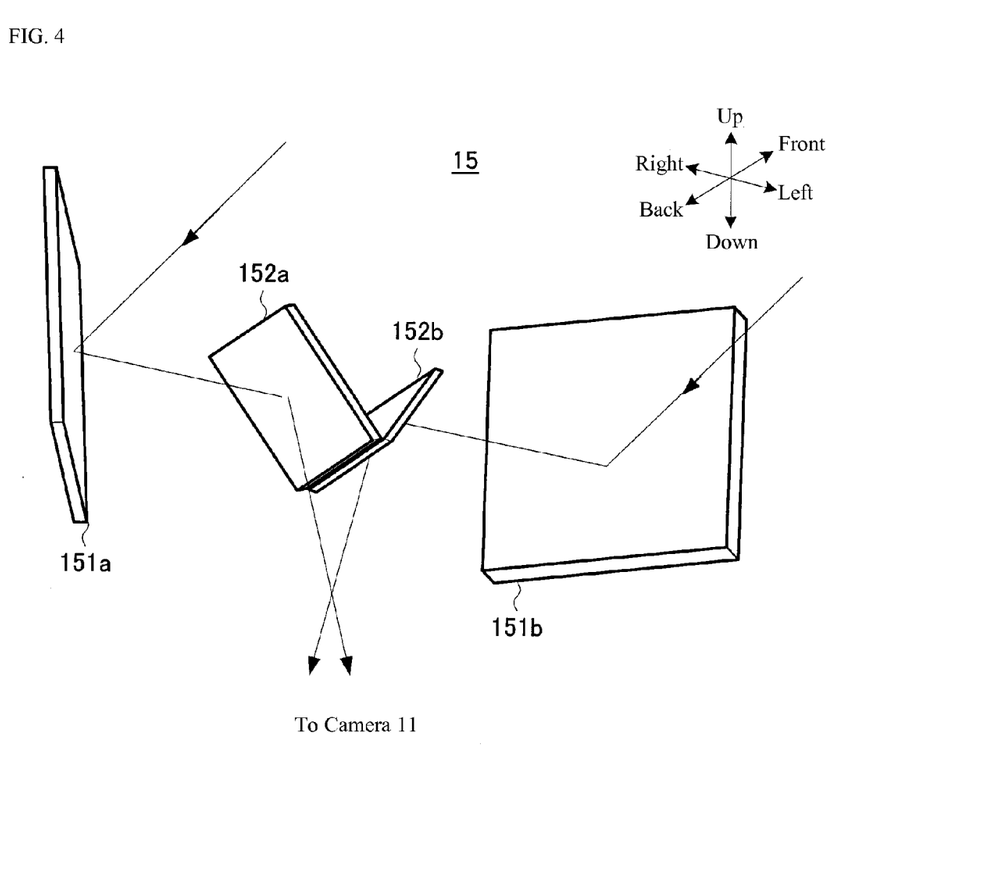
FIG. 4 is a diagram for explaining a stereo imaging optics system in the facial validation sensor according to the Another Example.

An example structure for a stereo adapter 21 is given in FIG. 4.

The stereo adapter 21 has one pair of first reflecting mirrors 151a and 151b that reflect, in horizontal directions, the incident light from the object being imaged, and one pair of second reflecting mirrors 152a and 152b that reflect, in the vertical direction, the incident light from the first reflecting mirrors. The two first reflecting mirrors 151a and 151b are disposed symmetrically with each other, to reflect, respectively, a right eye image and a left eye image of the individual to be validated. The two second reflecting mirrors 152a and 152b input, into the camera 11, which is disposed below the stereo adapter 21, the right eye image and the left eye image of the individual to be validated, which are reflected, respectively, by the first reflecting mirrors 151a and 151b. The camera 11 images, through the stereo adapter 21, the individual to be validated, to thereby output, to the validating unit 22, a stereo image of the individual to be validated.

Even given the presence of the stereo adapter 21, the flat mirror 14, of course, is no different from that in the Example in the point that it has the property of the region that is reflected on the flat mirror 14 from the individual to be validated being the same regardless of the distance between the flat mirror 14 and the person to be validated.

Consequently, if the person to be validated places his or her face at a location wherein the face can be seen reflected in the flat mirror 14, in the comparison range D (FIG. 2) of the facial validation sensor 3, then regardless of the distance between the individual to be validated and the stereo adapter, the face of the individual to be validated will be placed within the imaging range of the camera 11, facing a direction that is appropriate for validation.

In other words, the flat mirror 14 in the Another Example provides the face that is reflected in the mirror 14 (and, in particular, the eyes and the vicinity thereof) as an indicator when the individual to be validated is positioning the location and orientation of his or her own face, in the imaging region (R) that is imaged by the camera 11 through the stereo adapter 21.

Consequently, it is possible to induce the face of the individual to be validated into the imaging region of the facial validation sensor, and to cause the individual to be validated to turn the face in a specific direction (toward the stereo adapter 21), regardless of the distance between the individual to be validated and the stereo adapter 21, through having the individual to be validated place his or her own face so as to be able to view the reflection of his or her own face in the flat mirror 14 within the comparison range D of the facial validation sensor 1.

Moreover, because in the Another Example it is difficult for the person to be validated to identify the camera 11 directly, and thus difficult for the individual to be validated to estimate the location and orientation required for the face during facial validation, the individual to be validated determines the location and orientation while viewing the reflection of his or her own face in the flat mirror 14, thus enabling the face of the individual to be validated to be facing in the appropriate direction for facial validation, within the imaging range.

Yet Another Example

Yet Another Example according to the present invention will be explained next.

Figure 5:
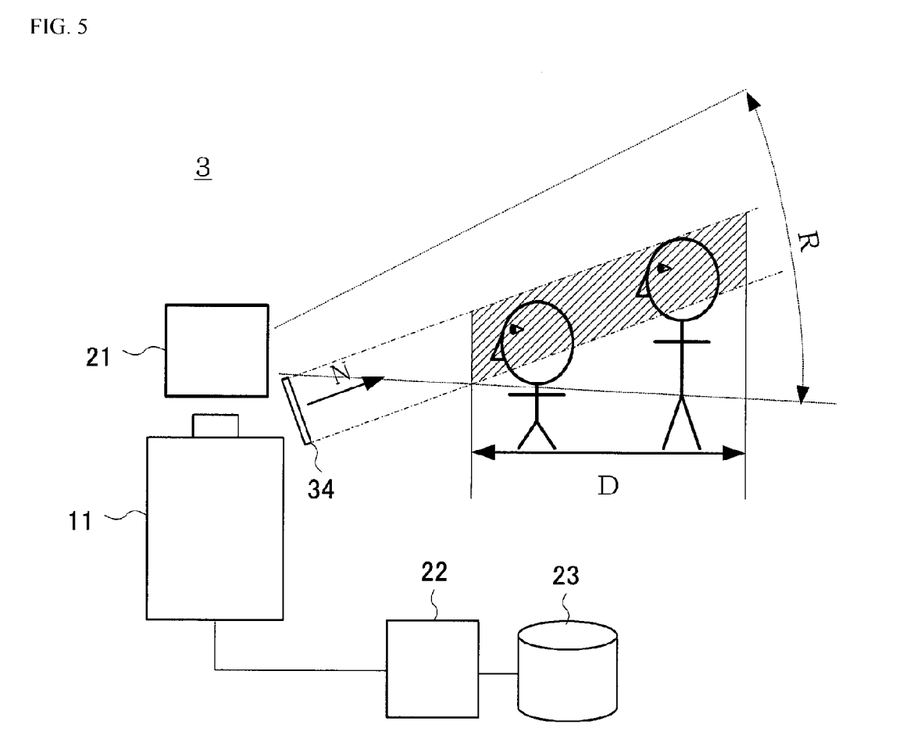
FIG. 5 is a diagram for explaining a facial validation sensor according to Yet Another Example according to the present invention.

The facial validation sensor 3 according to the Yet Another Example according to the present invention uses, as the feedback unit, a visual marker made from a lenticular lens and a pattern applied to the lenticular lens. The configuration thereof is illustrated in FIG. 5.

The facial validation sensor 3 according to the Yet Another Example includes a camera 11 that has a built-in imaging element, a stereo adapter 21 that provides a stereo image to a monocular camera 11, a database 23 that registers facial image data that is obtained in advance (registered facial image data), a validating unit 22 that validates individuals to be validated based on a facial image data of the individual to be validated, imaged by the camera 11 (input facial image data), and the registered facial image data that is registered in advance in the database 23, and a visual marker 34 that operates as the feedback unit that guides the face of the individual to be validated into an imaging region that is imaged by the camera 11.

While the facial validation sensor 3 according to the Yet Another Example differs from the facial validation sensor 1 according to the Example and the facial validation sensor 2 according to the Another Example, described above, in the point that a visual marker 34 is provided as the feedback unit, they have the other aspects in common. Consequently, those structural elements that are in common with those of the Another Example are indicated using identical codes, and detailed explanations thereof are omitted.

Figure 6:
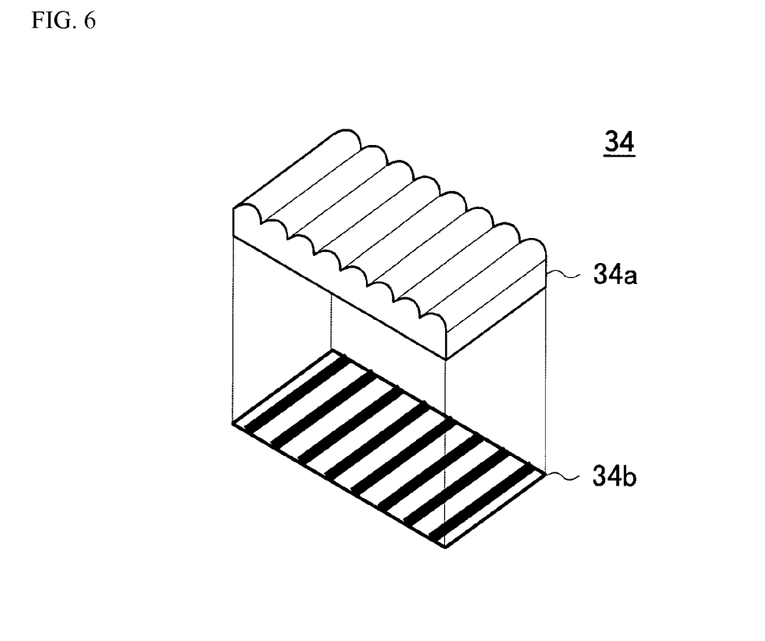
FIG. 6 is a diagram for explaining the structure of a visual marker in the facial validation sensor according to the Yet Another Example.

The visual marker 34, as illustrated in FIG. 6, has a lenticular lens 34a wherein a plurality of cylindrical lenses is arranged with equal spacing, and a pattern 34b that is applied to the lenticular lens 34a.

Figure 7:
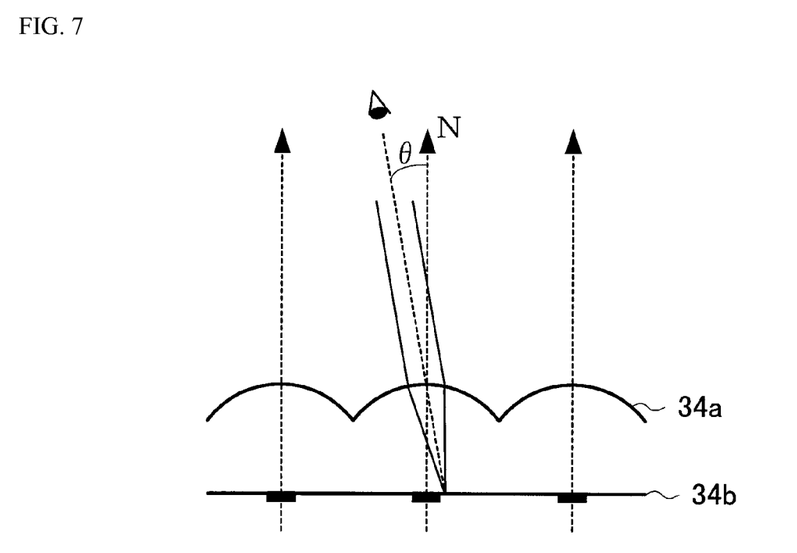
FIG. 7 is a diagram for explaining the principle of a visual marker in the facial validation sensor according to the Yet Another Example.
Figure 8:
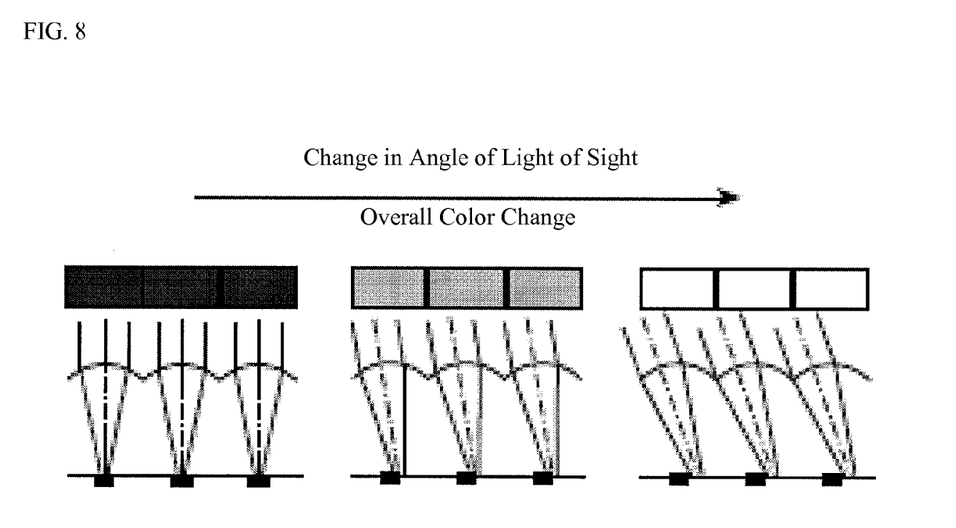
FIG. 8 is a diagram for explaining the principle of a visual marker in the facial validation sensor according to the Yet Another Example.

The pattern 34b of the visual marker 34 has a striped pattern with the same spacing as the spacing of the lenses in the lenticular lens 34a, as illustrated in FIG. 6 or FIG. 7, where, when applied so that this striped pattern is spatially synchronized with the lenses of the lenticular lens 34a (that is, applied so that the black lines are positioned directly under the cylindrical lenses that structure the lenticular lens 34a), then the black lines that structure the striped pattern will be visible from the front of the visual marker 34, but when the angle θ (the viewing angle) formed between the line of sight and the direction N of the normal line of the lenticular lens 34a gets large, the black lines become invisible.

In this way, there is a correlation between the image that can be seen through the lenticular lens 34a and the viewing angle θ, and thus it is possible to produce a visual marker 34 through selecting an appropriate pattern 34b and an appropriate positional relationship between this pattern and the lenticular lens 34a, so that the specific pattern can be viewed along the normal line of the lenticular lens 34a but cannot be viewed if the viewing angle is greatly shifted therefrom. Furthermore, while the pattern viewed in the visual marker 34 is dependent on the viewing angle θ, it is independent of the distance between the visual marker 34 and the viewpoint.

In the Yet Another Example, as illustrated in FIG. 5, the visual marker 34 that is used as the feedback unit is disposed in the vicinity of the stereo adapter 21, and the normal line N thereof is directed in essentially the same direction as the direction of imaging by the camera 11 through the stereo adapter 21. The result is that the individual to be validated can view the specific pattern only from the direction of the normal line N of the lenticular lens 34a in the comparison region D (FIG. 5) of the facial validation sensor 3.

In other words, the visual marker 34 in the Yet Another Example provides a specific pattern as an indicator when the individual to be validated is positioning the location and orientation of his or her own face, in the imaging region (R) that is imaged by the camera 11 through the stereo adapter 21.

Consequently, in the facial validation sensor 3, if the person to be validated places his or her face at a location wherein the specific pattern of the visual marker 34 can be seen, then regardless of the distance between the individual to be validated and the stereo adapter, the face of the individual to be validated will be placed within the imaging range of the camera 11, facing a direction that is appropriate for validation.

Consequently, it is possible to induce the face of the individual to be validated into the imaging region of the facial validation sensor, and to cause the individual to be validated to turn the face in a specific direction (toward the stereo adapter 21), regardless of the distance between the individual to be validated and the stereo adapter 21, through having the individual to be validated place his or her own face so as to be able to view the specific pattern of the visual marker 34 within the comparison range D of the facial validation sensor 3.

Moreover, in the Yet Another Example, even if it is difficult for the individual to be validated to recognize directly the camera 11 when, for example, a stereo adapter 21, or the like, is provided, having the individual to be validated view the specific pattern of the visual marker 34 makes it possible to cause the face of the individual to be validated to face an appropriate direction for facial validation, within the imaging region.

Note that it is possible to determine essentially uniquely the positions of the top, bottom, left, and right of the individual to be validated, relative to the facial validation sensor 3, through using, as the visual marker 34 that uses a lenticular lens 34a, a visual marker wherein a plurality of cylindrical lenses of the lenticular lens 34a are arranged in the vertical direction, and two mutually adjacent visual markers that are arranged in the horizontal direction, or arranged in a combination.

Further Example

Further Example according to the present invention will be explained next.

Figure 9:
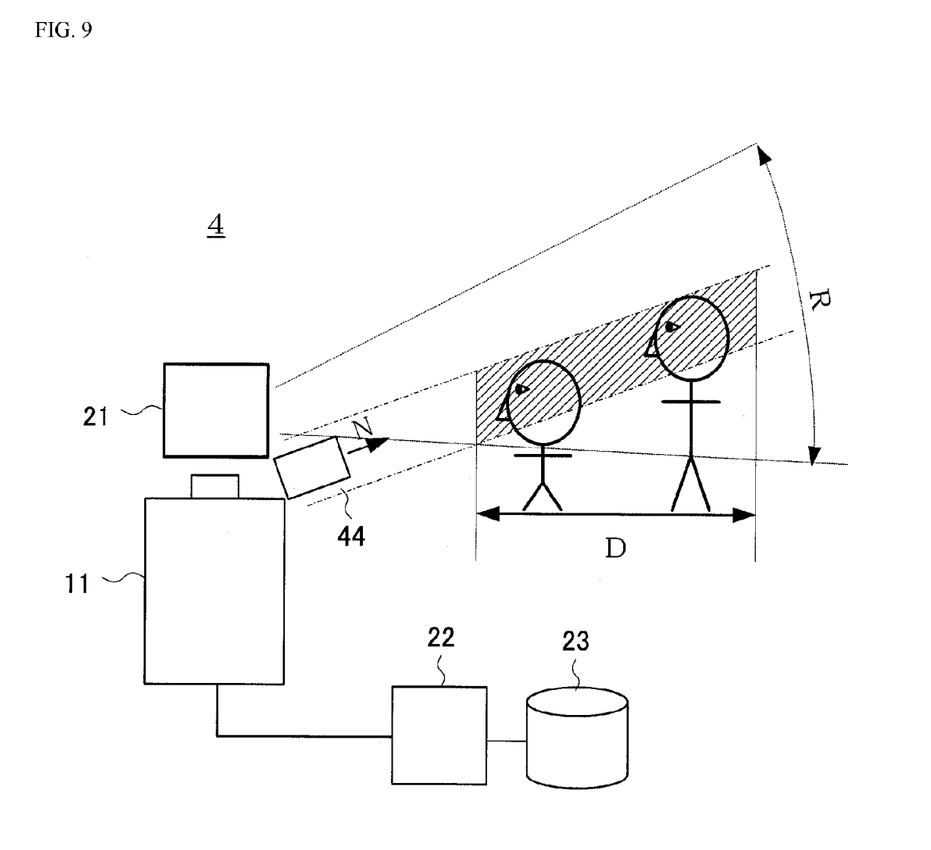
FIG. 9 is a diagram for explaining a facial validation sensor according to Further Example according to the present invention.

The facial validation sensor 4 according to the Further Example uses, as the feedback unit, a light-emitting device that combines a linear cylindrical member and a light source that is disposed in the vicinity of one end of the cylindrical member. The configuration thereof is illustrated in FIG. 9.

The facial validation sensor 4 according to the Further Example includes a camera 11 that has a built-in imaging element, a stereo adapter 21 that provides a stereo image to a monocular camera 11, a database 23 that registers facial image data that is obtained in advance (registered facial image data), a validating unit 22 that validates individuals to be validated based on a facial image data of the individual to be validated, imaged by the camera 11 (input facial image data), and the registered facial image data that is registered in advance in the database 23, and a light-emitting device 44 that operates as the feedback unit that guides the face of the individual to be validated into an imaging region that is imaged by the camera 11.

While the facial validation sensor 4 according to the Further Example differs from the facial validation sensor 1 according to the of Example and the facial validation sensor 2 according to the Another Example, described above, in the point that a light-emitting device 44 is provided as the feedback unit, they have the other aspects in common with the facial validation sensor 2 according to the Another Example. Consequently, those structural elements that are in common with those of the Another Example are indicated using identical codes, and detailed explanations thereof are omitted.

Figure 10:
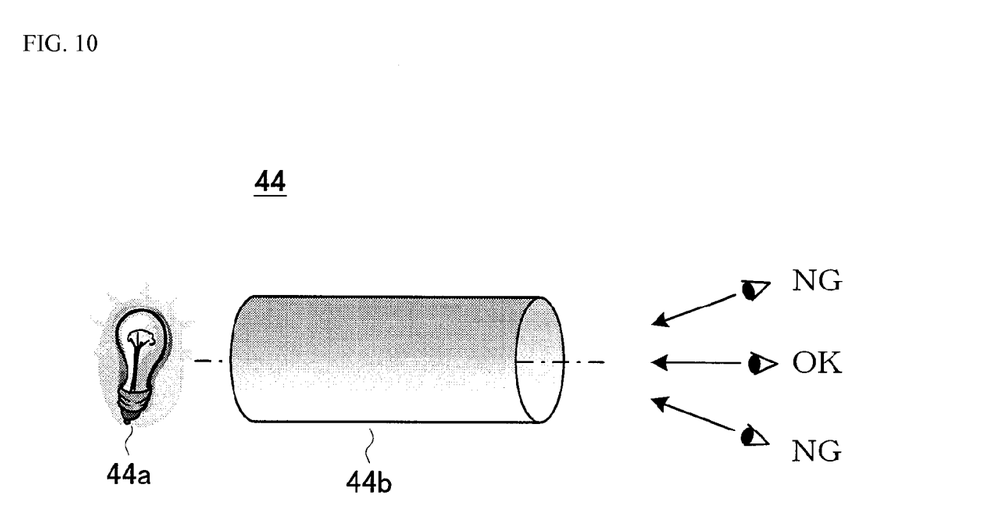
FIG. 10 is a diagram for explaining the structure and principle light-emitting in the facial validation sensor according to the Further Example.

The light-emitting device 44, as illustrated in FIG. 10, has a linear cylindrical member 44b and a light source 44a, which is disposed in the vicinity of one and portion of the cylindrical member.

Here a light-emitting device, such as an LED, may be used as the light source 44a.

On the other hand, the cylindrical member 44b, in the Further Example, is formed in a round cylindrical shape with a constant diameter along the axis. The length along the axis is structured so as to be sufficiently large in relation to the length (diameter) of the opening portion on the side that is distant from the light source 44a, and the light source 44a is disposed on the axis of the cylindrical member 44b.

The result, as shown in FIG. 10, is that when the light-emitting device 44 is viewed from the opposite end from the light source 44a, with the cylindrical member 44b therebetween, then the light source 44a will be visible if the viewpoint is located on or near the axis of the cylindrical member 44b, but the light from the light source 44a will be blocked by the cylindrical member 44b if at a location other than the axis, preventing the light source 44a from being seen.

In the Further Example, as illustrated in FIG. 9, the light-emitting device 44 that is used as the feedback unit is disposed in the vicinity of the stereo adapter 21, and the axis N cylindrical member 44b thereof is directed in essentially the same direction as the direction of imaging by the camera 11 through the stereo adapter 21. The result is that the individual to be validated can view the light source 44a only from the direction of the axis N of the cylindrical member 44b in the comparison region D (FIG. 9) of the facial validation sensor 4.

In other words, the light source 44a of the light-emitting device 44 in the Further Example serves as an indicator when the individual to be validated is positioning the location and orientation of his or her own face, in the imaging region (R) that is imaged by the camera 11 through the stereo adapter 21.

Consequently, in the facial validation sensor 4, if the person to be validated places his or her face at a location wherein the light source 44a can be seen through the cylindrical member 44b, then the face of the individual to be validated will be placed within the imaging range of the camera 11, facing a direction that is appropriate for validation.

Consequently, it is possible to induce the face of the individual to be validated into the imaging region of the facial validation sensor, and to cause the individual to be validated to turn the face in a specific direction (toward the stereo adapter 21), through having the individual to be validated place his or her own face so as to be able to view the light source 44a through the cylindrical member 44b within the comparison range D of the facial validation sensor 4.

Moreover, in the Further Example, even if it is difficult for the individual to be validated to recognize directly the camera 11 when, for example, a stereo adapter 21, or the like, is provided, having the individual to be validated view the light source 44a through the cylindrical member 44b makes it possible to cause the face of the individual to be validated to face an appropriate direction for facial validation, within the imaging region.

Note that while in the Further Example the explanation was for a cylindrical member of a circular cylinder, the shape of the cross-section that is perpendicular to the axis, depending on the use of the facial validation sensor 4, may be a shape other than a circle, such as an ellipse or a polygon. Moreover, the inner diameter of the cylindrical member 44b need not necessarily be a constant size along the axis, but rather may change, such as changing in a tapered shape, insofar as the range over which the light source 44a can be viewed is limited.

Moreover, a pilot lamp that indicates whether or not the light source of the facial validation sensor 4 is ON, or a light-emitting element, such as an LED, that indicates the state of detection or validation of the face, may be used as the light source 44a.

Modified Example

In the Examples, set forth above, the explanations were for the feedback unit being a flat mirror 14, a visual marker 34 that uses a lenticular lens, and a light-emitting device 44 that uses a cylindrical member, but in the present invention a plurality of feedback units, of either one type or different types, may be combined.

For example, high precision facial placement and orientation can be achieved through a combination of two or three flat mirrors 14 having slightly different normal directions, or a combination of a visual marker 34 that uses a lenticular lens and a light-emitting device 44, as the feedback unit.

Figure 11:
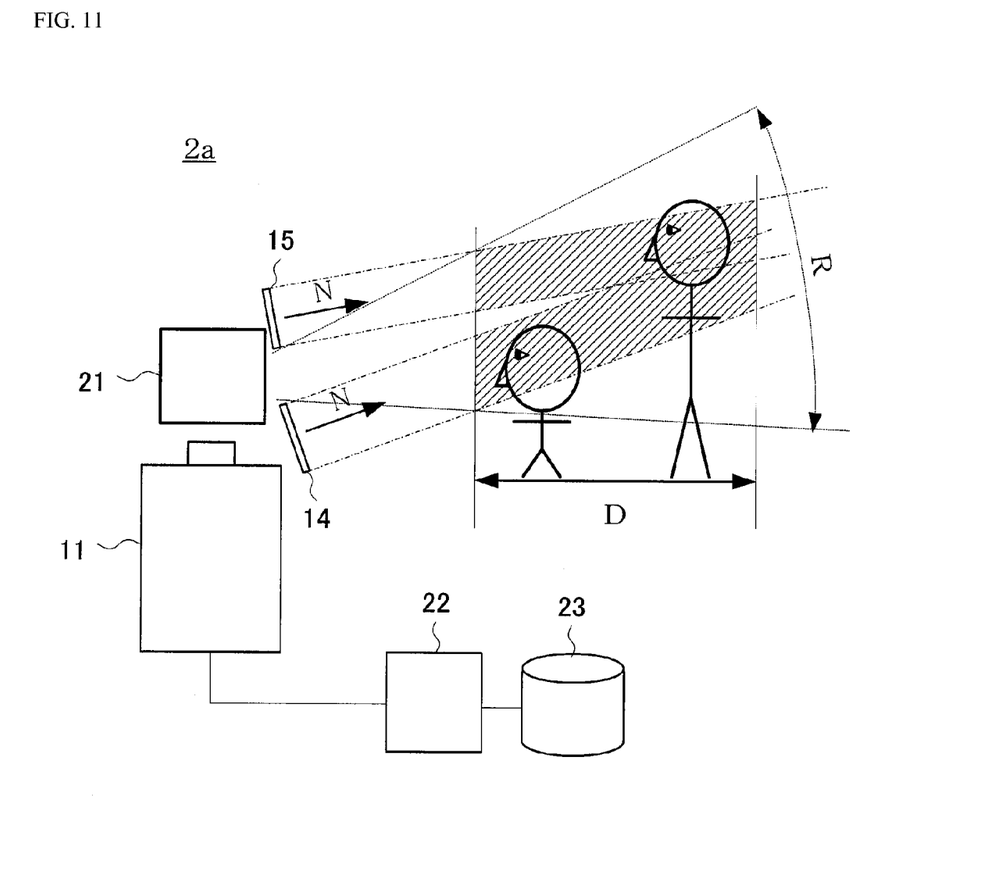
FIG. 11 is a diagram illustrating a modified example of the Another Example according to the present invention.
Figure 12:
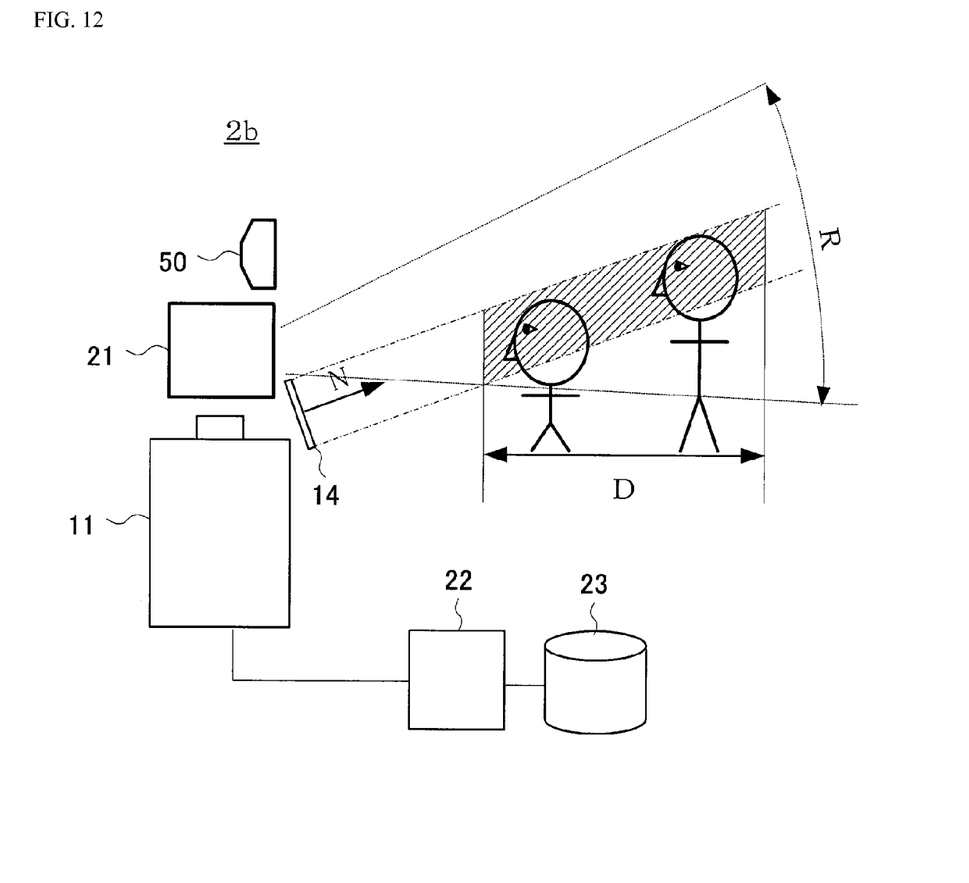
FIG. 12 is a diagram illustrating a modified example of the Another Example according to the present invention.

Specifically, a modified example of the Another Example is illustrated in FIG. 11. The facial validation sensor 2a illustrated in FIG. 11 is provided with two flat mirrors 14 and 15 as the feedback unit. The addition of the flat mirror 15 to the flat mirror 14 enables the facial validation sensor to be compatible with a broader range of statures for the individuals to be validated, through the combinations of these flat mirrors 14 and 15, and the respective adjustments of the normal lines thereof, for individuals to be validated who have taller statures. A broader scope of statures can be handled similarly using visual markers instead of flat mirrors.

One can expect a synergistic effect, such as more greatly stabilizing the orientations of the faces of the individuals be validated, through the provision of a display device 50, such as an LCD (liquid crystal display), in the vicinity of the flat mirror 14 that is the feedback unit or in the vicinity of the camera 11 or stereo adapter 21, for displaying a message such as "Please look into the reflection of your eyes."

Additionally, the facial validation sensor may be provided with a mechanism for adjusting the direction N of the feedback unit (14, 15, 34, 44). Such a mechanism enables the adjustment of the direction N where the equipment is used.

Moreover, a pattern illustrating the shape of the head or eyes may be applied to the surface of the mirror when using a flat mirror 14 (15) as the feedback unit.

While in the Examples set forth above the examples combined a monocular camera 11 and a stereo adapter 21 in order to perform stereo imaging, a complex camera system including binocular optics may be used instead.

The invention claimed is:

1. A facial validation sensor comprising:
an imaging device;
a validating processor validating an individual to be validated based on facial image data of the individual, imaged by the imaging device, and facial image data registered in advance; and
a feedback device guiding a face of the individual to be within an imaging range that is imaged by the imaging device,
wherein the feedback device provides an indicator that is viewable from a specific direction within the imaging range that is imaged by the imaging device,
wherein the feedback device is a flat mirror that reflects the face of the individual to be validated, and
wherein a direction of a normal line of the flat mirror is coincident with the specific direction.

2. A facial validation sensor, comprising:
an imaging device;
a validating processor validating an individual to be validated based on facial image data of the individual, imaged by the imaging device, and facial image data registered in advance; and
a feedback device guiding a face of the individual to be within an imaging range that is imaged by the imaging device,
wherein the feedback device provides an indicator that is viewable from a specific direction within the imaging range that is imaged by the imaging device,
wherein the feedback device is a visual marker including a lenticular lens having a plurality of cylindrical lenses arranged with equal spacing and a pattern applied to the lenticular lens, and
wherein a specific marker is viewable, as the indicator, from the specific direction.

3. A facial validation sensor, comprising:

an imaging device;

a validating processor validating an individual to be validated based on facial image data of the individual, imaged by the imaging device, and facial image data registered in advance; and a feedback device guiding a face of the individual to be within an imaging range that is imaged by the imaging device, wherein the feedback device provides an indicator that is viewable from a specific direction within the imaging range that is imaged by the imaging device, wherein the feedback device is a linear cylindrical member and a light-emitting device that has a light source that is disposed in a vicinity of one end portion of the cylindrical member, and wherein an axis of the cylindrical member is coincident with the specific direction.

4. A facial validation sensor, comprising:

an imaging device;

a validating processor validating an individual to be validated based on facial image data of the individual, imaged by the imaging device, and facial image data registered in advance;

a feedback device guiding a face of the individual to be within an imaging range that is imaged by the imaging device; and an optics system disposed between the imaging device and the individual to be validated, and provides a stereo image to the imaging device, wherein the feedback device provides an indicator that is viewable from a specific direction within the imaging range that is imaged by the imaging device, and wherein the feedback device is disposed adjacent to the optics system.

* * * * *